US012689136B2

(12) United States Patent
Sato et al.

(10) Patent No.: US 12,689,136 B2
(45) Date of Patent: Jul. 21, 2026

(54) ANTENNA DEVICE AND COMMUNICATION DEVICE EQUIPPED THEREWITH

(71) Applicant: Murata Manufacturing Co., Ltd., Nagaokakyo (JP)

(72) Inventors: Yosuke Sato, Nagaokakyo (JP); Kengo Onaka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 34 days.

(21) Appl. No.: 18/791,475

(22) Filed: Aug. 1, 2024

(65) Prior Publication Data

US 2024/0396230 A1 Nov. 28, 2024

Related U.S. Application Data

(63) Continuation of application No. PCT/JP2023/000398, filed on Jan. 11, 2023.

(30) Foreign Application Priority Data

Mar. 10, 2022 (JP) ................................ 2022-037149

(51) Int. Cl.
*H01Q 1/42* (2006.01)
*H01Q 21/06* (2006.01)

(52) U.S. Cl.
CPC ........... *H01Q 21/065* (2013.01); *H01Q 1/422* (2013.01)

(58) Field of Classification Search
CPC ........ H01Q 21/065; H01Q 1/422; H01Q 3/26; H01Q 9/0414; H01Q 9/045; H01Q 21/24; H01Q 21/08; H01Q 1/42
See application file for complete search history.

(56) References Cited

U.S. PATENT DOCUMENTS 5,396,397 A * 3/1995 McClanahan .......... H05K 1/162 257/E23.173
5,510,802 A * 4/1996 Tsuru ....................... H01Q 9/42 343/849

(Continued)

FOREIGN PATENT DOCUMENTS

JP H05121925 A * 5/1993 ........... H01Q 9/0442
JP H06-140823 A 5/1994

(Continued)

OTHER PUBLICATIONS

International Search Report and Written Opinion mailed on Mar. 28, 2023, received for International Application No. PCT/JP2023/000398, filed on Jan. 11, 2023, 08 pages including English Translation.

*Primary Examiner* — Dameon E Levi
*Assistant Examiner* — Jordan E. DeWitt
(74) *Attorney, Agent, or Firm* — XSENSUS LLP

(57) ABSTRACT

An antenna device includes a base body, a flat plate-like radiating element placed in the base body, a flat plate-like ground electrode arranged substantially parallel to the radiating element, and high-dielectric layers placed on side surfaces of the base body, the dielectric constants of the high-dielectric layers being higher than that of the base body. At least part of one of the high-dielectric layers is located between the radiating element and the ground electrode when seen from an X-axis direction that is the normal direction of the side surfaces and is located outside the ground electrode when seen from a Z-axis direction that is the normal direction of a top surface.

20 Claims, 7 Drawing Sheets

(56) References Cited

U.S. PATENT DOCUMENTS 7,460,072 B1 * 12/2008 Goldberger .............. H01Q 1/38
343/700 MS
11,139,203 B2 * 10/2021 Tsai ..................... H10D 64/017
11,177,552 B2 * 11/2021 Lu ........................ H01Q 1/2283
2002/0027018 A1 * 3/2002 Chikagawa ............. B32B 18/00
174/255
2002/0041255 A1 * 4/2002 Baba .................... H01Q 9/0442
343/846
2003/0234695 A1 * 12/2003 Haruta .................... H01P 11/00
333/219.1
2007/0247349 A1 * 10/2007 Masuda ............. H01Q 15/0013
342/4
2008/0088510 A1 * 4/2008 Murata .................... H01Q 3/24
343/876
2010/0046137 A1 * 2/2010 Adachi ................... C04B 35/20
501/4
2011/0063174 A1 * 3/2011 Cho ..................... H01Q 9/0457
343/702
2012/0031562 A1 * 2/2012 Setsuhara ............. H01J 37/321
156/345.48
2012/0242547 A1 * 9/2012 Fujii ........................ H01Q 1/38
343/700 MS
2016/0133556 A1 * 5/2016 Chiang ............... H10W 70/635
438/126
2019/0287727 A1 * 9/2019 Tomohiro .............. H01G 4/018
2019/0341693 A1 * 11/2019 Haziza .................... H01P 11/00
2020/0076035 A1 * 3/2020 Huh ........................ H01P 3/082
2020/0328518 A1 * 10/2020 Park ..................... H01Q 21/065
2021/0075099 A1 * 3/2021 Soga .................... H01Q 21/065
2021/0175609 A1 * 6/2021 Ryoo ....................... H01Q 9/42
2021/0384609 A1 * 12/2021 An ....................... H01Q 1/2283
2021/0384619 A1 * 12/2021 Tezuka ................. H01Q 9/0457
2022/0013328 A1 * 1/2022 Kim .................... H01J 37/3244
2022/0216590 A1 * 7/2022 Yamakawa .......... H01Q 21/065
2023/0145229 A1 * 5/2023 Thomas ............. H10D 30/6735
257/401
2023/0411862 A1 * 12/2023 Nakamura ........... H01Q 1/2283
2023/0411870 A1 * 12/2023 Sudo ........................ H01Q 5/40
2024/0105774 A1 * 3/2024 Guler ..................... H10D 84/83
2024/0106106 A1 * 3/2024 Gouchi .................. H01Q 21/24
2024/0203697 A1 * 6/2024 Kim ..................... H01J 37/3211
2024/0275035 A1 * 8/2024 Lee ........................ H01Q 1/405
2024/0321738 A1 * 9/2024 Guler ..................... H10D 84/85
2024/0396230 A1 * 11/2024 Sato ..................... H01Q 21/065
2025/0036908 A1 * 1/2025 Honda ................. G06K 19/077

FOREIGN PATENT DOCUMENTS

JP H08181530 A * 7/1996
JP H09-036647 A 2/1997
JP H0936648 A * 2/1997
JP 2005-005796 A 1/2005
JP 2020-195027 A 12/2020
WO 2019/163024 A1 8/2019
WO 2021/112031 A1 6/2021

* cited by examiner

COMPARATIVE EXAMPLE

PRESENT DISCLOSURE

ANTENNA DEVICE AND COMMUNICATION DEVICE EQUIPPED THEREWITH

CROSS-REFERENCE TO RELATED APPLICATIONS

This application is a continuation of international application no. PCT/JP2023/000398, filed Jan. 11, 2023, which claims priority to Japanese application no. 2022-037149, filed Mar. 10, 2022. The entire contents of both prior applications are hereby incorporated by reference.

TECHNICAL FIELD

The present disclosure relates to an antenna device and a communication device equipped therewith.

BACKGROUND ART

An antenna device includes a ceramic substrate, a plurality of radiating elements (antenna electrodes) provided on a top surface of the ceramic substrate, a ground electrode provided on a bottom surface of the ceramic substrate, and a dielectric film that is provided over the plurality of radiating elements and has a greater dielectric constant than the ceramic substrate.

SUMMARY

Technical Problem

With the recent advancement in the capabilities of communication terminals such as smartphones and the like, a space for mounting an antenna device in the communication terminal is likely to be limited. For this reason, in the antenna device, it is expected that the width of the ground electrode may become narrower and a sufficient width of the ground electrode relative to the width of the radiating element may be difficult to secure. In that case, it is feared that electrical lines of force originated from an end part of the radiating element in the width direction may fail to fall onto the ground electrode and be released to the outside of the ceramic substrate, and that as a result, the frequency band of the antenna device may become narrower, and the radiation efficiency may decrease.

The present disclosure is made to resolve issues such as the ones described in the above, and an exemplary object thereof is to suppress narrowing of a frequency band of an antenna device even in a case where a sufficient width of a ground electrode cannot be secured relative to the width of a radiating element.

Solution to Problem

An antenna device according to the present disclosure includes a base body having a top surface, a bottom surface, and a plurality of side surfaces that connect the top surface and the bottom surface. The top surface and the bottom surface having polygonal shapes and facing one another. A first radiating element is placed in the base body. The first radiating element has a plate-like shape and is arranged substantially parallel to the top surface. A ground electrode is placed at a position that is closer to the bottom surface than the first radiating element. The ground electrode has a plate-like shape and is arranged substantially parallel to the first radiating element. The antenna device also includes a first high-dielectric portion whose dielectric constant is higher than that of the base body. The first high-dielectric portion is placed on at least one of the plurality of side surfaces. At least part of the first high-dielectric portion is located between the first radiating element and the ground electrode when the first high-dielectric portion is seen from a first direction that is a normal direction of the side surface on which the first high-dielectric portion is placed, and is located outside the ground electrode when the first high-dielectric portion is seen from a second direction that is a normal direction of the top surface.

Advantageous Effects

According to the present disclosure, the first high-dielectric portion whose dielectric constant is higher than that of the base body is provided on the side surface of the base body in which the first radiating element is placed. At least part of the first high-dielectric portion is located between the first radiating element and the ground electrode when the first high-dielectric portion is seen from the first direction (the normal direction of the side surface) and is located outside the ground electrode when the first high-dielectric portion is seen from the second direction (the normal direction of the top surface). Because of this, electrical lines of force originated from an end part of the first radiating element in the first direction (width direction) are not likely to be released to the outside of the first high-dielectric portion and are likely to fall onto the ground electrode via the inside or vicinity of the first high-dielectric portion. As a result, it becomes possible to suppress narrowing of a frequency band of the antenna device even in the case were a sufficient dimension (width) of the ground electrode in the first direction cannot be secured.

DESCRIPTION OF EMBODIMENTS

Figure 1:
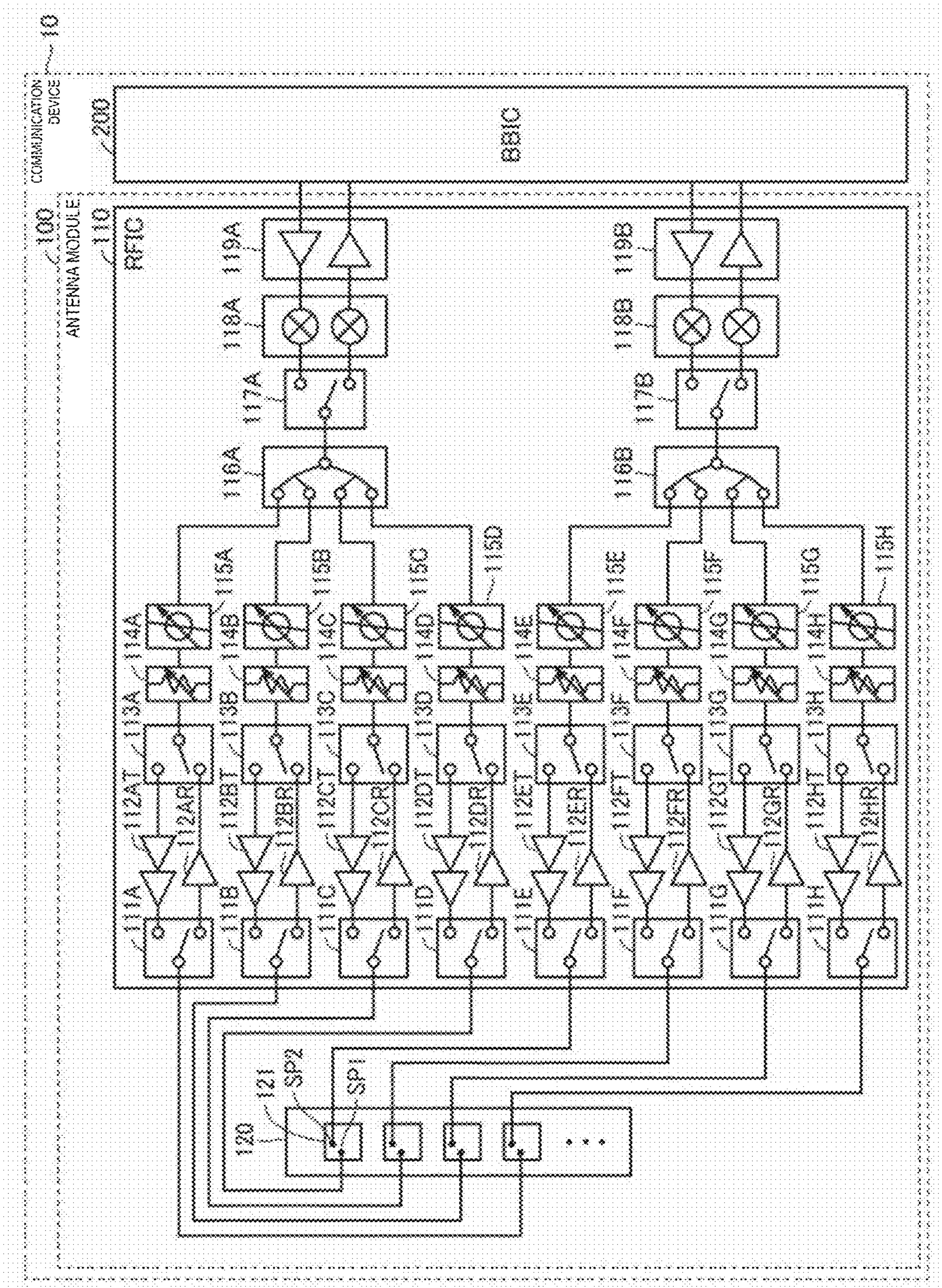
FIG. 1 is an example of a block diagram of a communication device in which an antenna device is used.

Hereinafter, exemplary embodiments of the present disclosure are described in detail with reference to the drawings. Note that the same reference characters are assigned to the same or corresponding parts of the drawings, and descriptions thereof will not be repeated.

(Basic Configuration of Communication Device)

FIG. 1 is an example of a block diagram of a communication device 10 in which an antenna device 120 according to the present exemplary embodiment is used. The communication device 10 is, for example, a mobile terminal such as a mobile phone, a smartphone, a tablet, or the like, a personal computer having communication capability, or the like. Examples of the frequency band of radio waves to be used for the antenna device 120 according to the present exemplary embodiment are, for example, radio waves of millimeter wave bands whose center frequencies are 28 GHZ, 39 GHZ, 60 GHZ, and the like. However, radio waves of frequency bands other than the above are also applicable.

Referring to FIG. 1, the communication device 10 includes an antenna module 100 and a BBIC 200, which makes up a baseband signal processing circuit. The antenna module 100 includes a radio frequency integrated circuit (RFIC) 110, which is one example of a feed device, and the antenna device 120. The communication device 10 up-converts a signal, which is transmitted from the base band integrated circuit (BBIC) 200 to the antenna module 100, into a radio frequency signal using the RFIC 110 and emits this radio frequency signal from the antenna device 120. Further, the communication device 10 sends a radio frequency signal received by the antenna device 120 to the RFIC 110, down-converts this radio frequency signal, and processes the down-converted signal using the BBIC 200.

The antenna module 100 is a so-called dual polarized-type antenna module capable of radiating two radio waves whose polarization directions are different from each other. The antenna device 120 includes a plurality of radiating elements 121. Each of the plurality of radiating elements 121 is a flat plate-like patch antenna having an approximately square shape. Note that in FIG. 1, for ease of description, of the plurality of radiating elements 121 included in the antenna device 120, only the configuration corresponding to four radiating elements 121 is illustrated, and the configuration corresponding to other radiating elements 121 with a similar configuration is omitted.

In each of the plurality of radiating elements 121, a first feed point SP1 to which a radio frequency signal for a first polarization is supplied from the RFIC 110 and a second feed point SP2 to which a radio frequency signal for a second polarization is supplied from the RFIC 110 are provided. Note that the antenna module 100 is not limited to the dual polarized-type antenna module and may alternatively be a single polarized-type antenna module.

The RFIC 110 includes switches 111A to 111H, 113A to 113H, 117A, and 117B, power amplifiers 112AT to 112HT, low-noise amplifiers 112AR to 112 HR, attenuators 114A to 114H, phase shifters 115A to 115H, signal combiner/splitters 116A and 116B, mixers 118A and 118B, and amplifier circuits 119A and 119B. Of these constituent elements, the configuration made up of the switches 111A to 111D, 113A to 113D, and 117A, the power amplifiers 112AT to 112DT, the low-noise amplifiers 112AR to 112DR, the attenuators 114A to 114D, the phase shifters 115A to 115D, the signal combiner/splitter 116A, the mixer 118A, and the amplifier circuit 119A is circuitry for the radio frequency signal for the first polarization. Further, the configuration made up of the switches 111E to 111H, 113E to 113H, and 117B, the power amplifiers 112ET to 112HT, the low-noise amplifiers 112ER to 112 HR, the attenuators 114E to 114H, the phase shifters 115E to 115H, the signal combiner/splitter 116B, the mixer 118B, and the amplifier circuit 119B is circuitry for the radio frequency signal for the second polarization.

When a radio frequency signal is transmitted, the switches 111A to 111H and 113A to 113H are switched to the sides of the power amplifiers 112AT to 112HT, and the switches 117A and 117B are connected to transmitting side amplifiers of the amplifier circuits 119A and 119B. When a radio frequency signal is received, the switches 111A to 111H and 113A to 113H are switched to the sides of the low-noise amplifiers 112AR to 112 HR, and the switches 117A and 117B are connected to receiving side amplifiers of the amplifier circuits 119A and 119B.

Signals transmitted from the BBIC 200 are amplified in the amplifier circuits 119A and 119B and up-converted in the mixers 118A and 118B. Transmitting signals that are up-converted radio frequency signals are each split into four signals in the signal combiner/splitters 116A and 116B, and these split signals are fed to different radiating elements 121 after traveling through corresponding signal paths.

Received signals that are radio frequency signals received by the respective radiating elements 121 are transmitted to the RFIC 110 and combined in the signal combiner/splitters 116A and 116B after traveling through the four different signal paths. Combined received signals are down-converted in the mixers 118A and 118B, amplified in the amplifier circuits 119A and 119B, and transmitted to the BBIC 200.

The RFIC 110 is formed as, for example, a one-chip integrated circuit component including the foregoing circuit configuration. Alternatively, the devices (switch, power amplifier, low-noise amplifier, attenuator, and phase shifter) corresponding to each radiating element 121 in the RFIC 110 may be formed as a one-chip integrated circuit component for each radiating element 121.

(Structure of Antenna Device)

Figure 2:
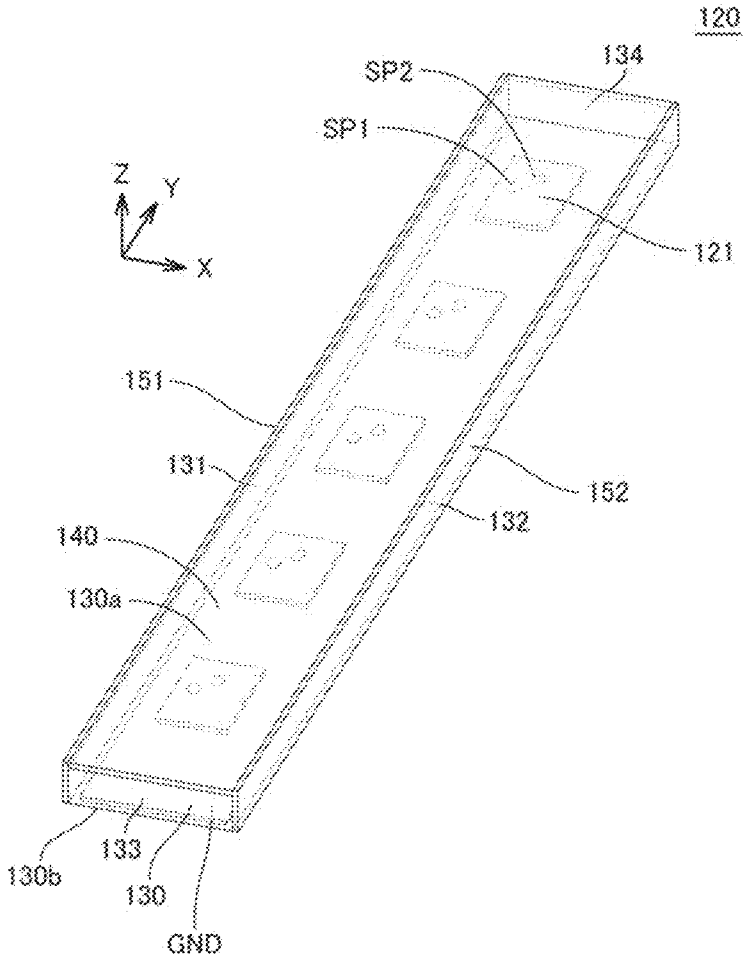
FIG. 2 is a perspective view of the antenna device.
Figure 3:
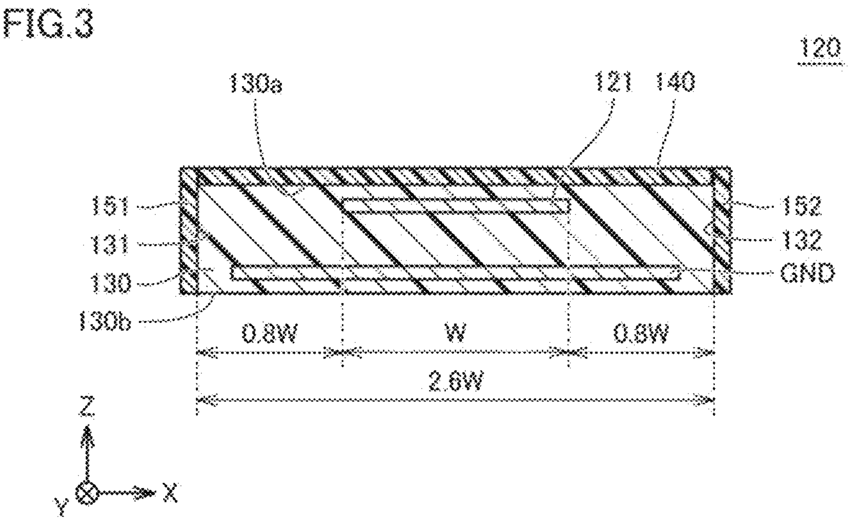
FIG. 3 is a cross-sectional view (part 1) of an antenna device.

FIG. 2 is a perspective view of the antenna device 120. FIG. 3 is a cross-sectional view of the antenna device 120. Referring to FIG. 2 and FIG. 3, the configuration of the antenna device 120 will be described in detail.

The antenna device 120 includes a base body 130 having dielectric property, a plurality of radiating elements 121 having flat plate-like shapes, a ground electrode GND having a flat plate-like shape, and high-dielectric layers 140, 151, and 152.

The base body 130 is, for example, a low temperature co-fired ceramics (LTCC) multilayer substrate, a multilayer resin substrate in which a plurality of resin layers, each of which is composed of a resin such as epoxy, polyimide, or the like, are laminated, a multilayer resin substrate in which a plurality of resin layers, each of which is composed of a liquid crystal polymer (LCP) having a lower dielectric constant, are laminated, a multilayer resin substrate in which a plurality of resin layers, each of which is composed of a fluorine-based resin, are laminated, a multilayer resin substrate in which a plurality of resin layers, each of which is composed of a polyethylene terephthalate (PET) material, are laminated, or a ceramics multilayer substrate other than LTCC. Note that the base body 130 does not necessarily have a multilayer structure and may alternatively be a single layer substrate.

The base body 130 has an approximately cuboid shape. The base body 130 has a top surface 130*a*, a bottom surface 130*b*, and four side surfaces 131 to 134 that connect the top surface 130*a* and the bottom surface 130*b*, and the top surface 130*a* and the bottom surface 130*b* have rectangular shapes and face each other. The side surfaces 131 and 132 face each other with the shorter sides of the top surface 130*a* and the bottom surface 130*b* interposed therebetween. The side surfaces 133 and 134 face each other with the longer sides of the top surface 130*a* and the bottom surface 130*b* interposed therebetween.

Hereinafter, the normal direction of the top surface 130*a* of the base body 130 is also referred to as "Z-axis direction", the direction along the shorter sides of the top surface 130*a* and the bottom surface 130*b* is also referred to as "X-axis direction", and the direction along the longer sides of the top surface 130*a* and the bottom surface 130*b* is also referred to as "Y-axis direction". Further, hereinafter, in the drawings, the positive direction of the Z-axis (direction from the bottom surface 130*b* to the top surface 130*a*) may sometimes be described as the upper side, and the negative direction of the Z-axis (direction from the top surface 130*a* to the bottom surface 130*b*) may sometimes be described as the lower side.

The plurality of radiating elements 121 are arranged in a layer near the top surface 130*a* of the base body 130 in such a manner as to form an array in which the radiating elements 121 are lined up in the Y-axis direction with a predetermined gap therebetween. By arranging the plurality of radiating elements 121 in an array formation as described above, it becomes possible to improve the antenna gain. Each radiating element 121 is arranged approximately parallel to the top surface 130*a*.

As described above, each of the plurality of radiating elements 121 are provided with the first feed point SP1 to which a radio frequency signal for the first polarization is supplied and the second feed point SP2 to which a radio frequency signal for the second polarization is supplied.

The first feed point SP1 is placed at a position shifted from the center of plane of the radiating element 121 to the negative direction of the X-axis. By supplying a radio frequency signal for the first polarization to the first feed point SP1, a radio wave whose polarization direction is the X-axis direction is radiated from the radiating element 121.

The second feed point SP2 is placed at a position shifted from the center of plane of the radiating element 121 to the positive direction of the Y-axis. By supplying a radio frequency signal for the second polarization to the second feed point SP2, a radio wave whose polarization direction is the Y-axis direction is radiated from the radiating element 121.

The ground electrode GND is placed in a layer near the bottom surface 130*b* of the base body 130 and is arranged approximately parallel to the radiating elements 121. The ground electrode GND is formed over substantially the entirety of the bottom surface 130*b*.

Each of the high-dielectric layers 140, 151, and 152 is composed of a dielectric material whose dielectric constant is higher than the dielectric constant of the base body 130. The high-dielectric layer 140 is placed on the top surface 130*a* of the base body 130. The high-dielectric layer 140 is formed in such a manner as to cover the entirety of the top surface 130*a*.

The high-dielectric layers 151 and 152 are arranged on the side surfaces 131 and 132 of the base body 130, respectively. The high-dielectric layers 151 and 152 are formed in such a manner as to cover the entirety of the side surfaces 131 and 132, respectively.

When the high-dielectric layers 151 and 152 are seen from the Z-axis direction (normal direction of the top surface 130*a*), the high-dielectric layers 151 and 152 are located outside the ground electrode GND. Further, when the high-dielectric layers 151 and 152 are seen from the X-axis direction (normal direction of the side surfaces 131 and 132), the high-dielectric layers 151 and 152 each have part that extends from an area overlapping the radiating element 121 to an area overlapping the ground electrode GND. Furthermore, the high-dielectric layers 151 and 152 are in contact with the high-dielectric layer 140 near the top surface 130*a*.

As illustrated in FIG. 3, in the antenna device 120 according to the present exemplary embodiment, a secured dimension of the base body 130 in the X-axis direction (hereinafter, the dimension in the X-axis direction is also referred to as "width") is only about 2.6 times the width W of the radiating element 121. Therefore, the width of the ground electrode GND is narrow, and a sufficient width of the ground electrode GND cannot be secured relative to the width of the radiating element 121. More specifically, the shortest distance in the X-axis direction from an end part of the radiating element 121 to an end part of the ground electrode GND is less than 0.8 times the width W of the radiating element 121.

As described above, in the case where a sufficient width of the ground electrode GND cannot be secured relative to the width of the radiating element 121, at the time of radiating radio waves whose polarization direction is the X-axis direction from the radiating element 121, some of electrical lines of force originated from an end part of the radiating element 121 in the X-axis direction do not fall onto the ground electrode GND and are released to the outside of the side surfaces 131 and 132 of the base body 130. As a result, it is feared that the frequency band of the radio waves whose polarization direction is the X-axis direction becomes narrower, and that the radiation efficiency decreases.

As a countermeasure to this, in the antenna device 120 according to the present exemplary embodiment, the high-dielectric layers 151 and 152 whose dielectric constants are higher than that of the base body 130 are arranged on the side surfaces 131 and 132 of the base body 130.

As described above, by adding the high-dielectric layers 151 and 152 on the side surfaces 131 and 132, the electrical lines of force originated from the end part of the radiating element 121 in the X-axis direction are not likely to be released to the outside of the high-dielectric layers 151 and 152 and are likely to fall onto the ground electrode GND via the inside or vicinity of the high-dielectric layer 151 or 152. As a result, the narrowing of the frequency band of the antenna device 120 is suppressed.

(Simulation)

The inventors of the present application performed a simulation to obtain the reflection characteristic of the antenna device 120 according to the present exemplary embodiment. Note that in this simulation, a similar simulation is also performed for a configuration of a comparative example to compare with the antenna device 120 according to the present exemplary embodiment.

Figure 4:
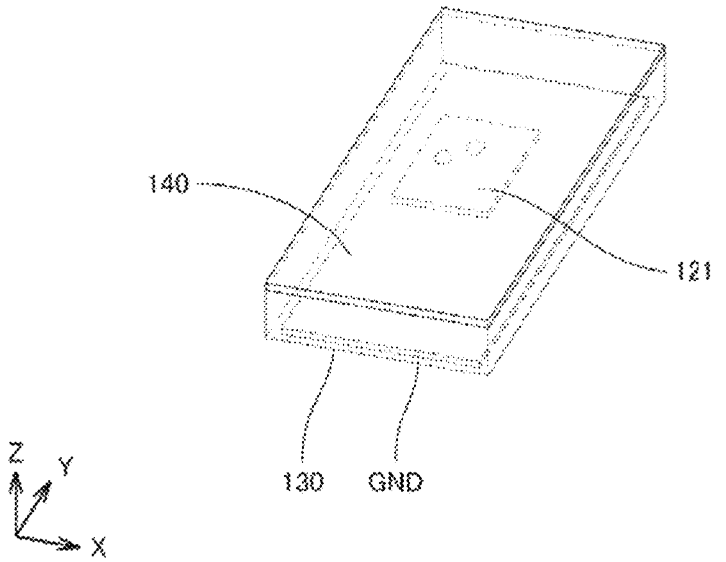
FIG. 4 is a diagram illustrating a configuration of an antenna device according to a comparative example, which is used in a simulation.

FIG. 4 is a diagram illustrating a configuration of an antenna device according to a comparative example that is used in the simulation. Compared with the antenna device 120 according to the present exemplary embodiment, the antenna device according to the comparative example includes only one radiating element 121. Furthermore, while keeping the high-dielectric layer 140 on the top surface 130*a*, the high-dielectric layers 151 and 152 are removed from the side surfaces 131 and 132. Note that the thickness of the high-dielectric layer 140 (dimension in the Z-axis direction) is 100 μm, and the dielectric constant of the high-dielectric layer 140 is 15.5.

Figure 5:
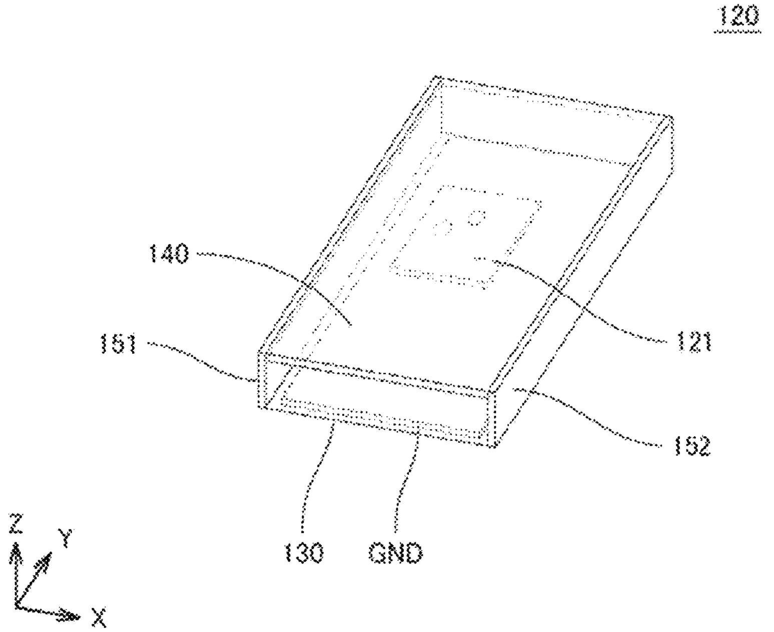
FIG. 5 is a diagram illustrating a configuration of an antenna device according to a present exemplary embodiment, which is used in the simulation.
Figure 8:
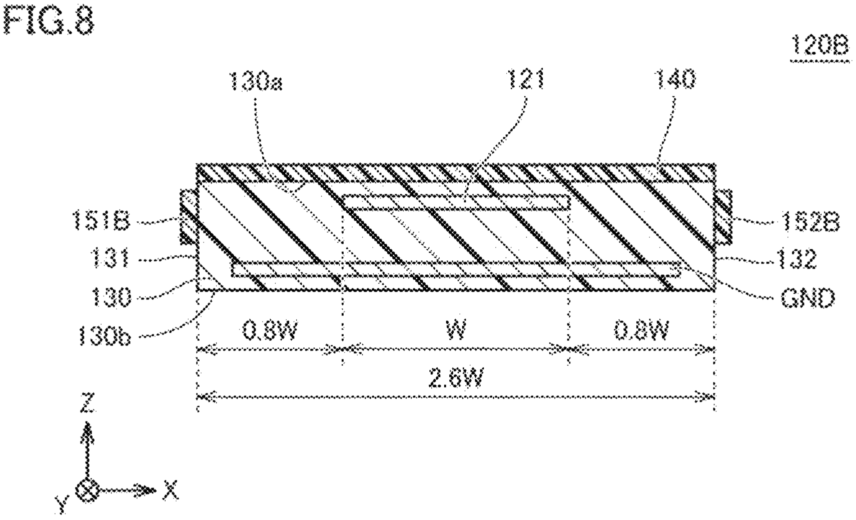
FIG. 8 is a cross-sectional view (part 3) of an antenna device.

FIG. 5 is a diagram illustrating a configuration of the antenna device 120 according to the present exemplary embodiment that is used in the simulation. In the simulation, as illustrated in FIG. 8, only one radiating element 121 is included, and the high-dielectric layers 140, 151, and 152 are attached. Note that the thickness of the high-dielectric layer 140 (dimension in the Z-axis direction) is 100 μm, the thicknesses of the high-dielectric layers 151 and 152 (dimension in the X-axis direction) are each 300 μm, and the dielectric constants of the high-dielectric layers 140, 151, and 152 are each 15.5.

Note that in the simulation, the frequency of radio waves that the antenna device radiates is in a millimeter wave band whose center frequency is 2.8 GHZ. The width of the radiating element 121 is 0.5 Ag where "Ag" is the wavelength of radio waves that propagate inside the base body 130 after being radiated from the radiating element 121.

Figure 6:
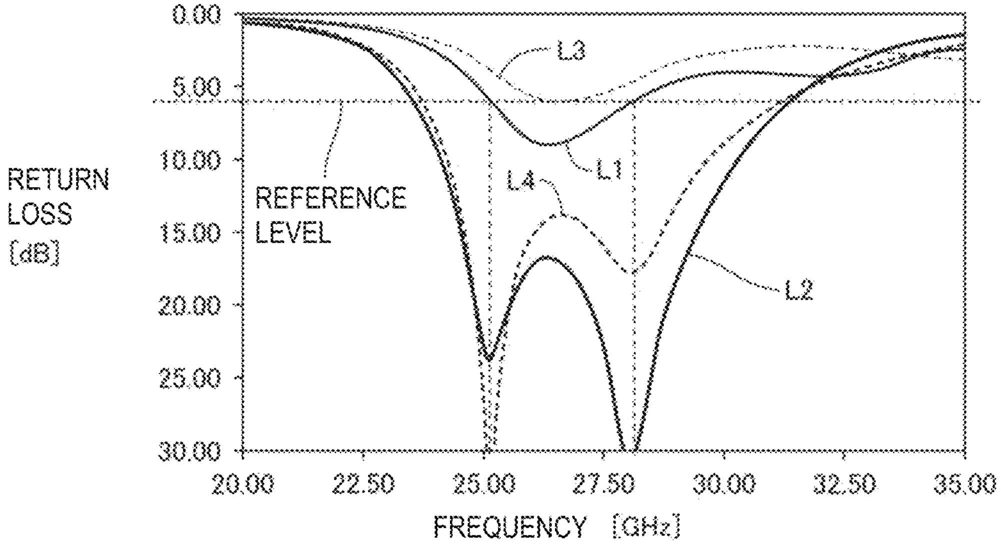
FIG. 6 is a diagram illustrating frequency characteristics of return loss obtained from a simulation result.

FIG. 6 is a diagram illustrating the frequency characteristic of the return loss obtained from a simulation result. In FIG. 6, the horizontal axis represents the frequency (GHz), and the vertical axis represents the return loss expressed in attenuation units.

The return loss is the ratio of reflected power to power input to the antenna device expressed in decibels (dB). In the case of total reflection (reflectance is 100%), the value of the return loss is 0 dB, and the value of the return loss increases as the reflection becomes smaller. In other words, it means that as the value of the return loss increases, the power loss caused by the reflection itself becomes smaller, and the return loss characteristic becomes more favorable.

In FIG. 6, curves L1 and L2 denoted by solid line indicate the return loss of radio waves whose polarization direction is the X-axis direction and the return loss of radio waves whose polarization direction is the Y-axis direction in the antenna device 120 of the present disclosure (present exemplary embodiment), respectively. Curves L3 and L4 denoted by dashed line indicate the return loss of radio waves whose polarization direction is the X-axis direction and the return loss of radio waves whose polarization direction is the Y-axis direction in the antenna device of the comparative example, respectively.

As illustrated in FIG. 6, compared with the antenna device of the comparative example, in the antenna device 120 of the present disclosure, it is clear that the frequency band that satisfies a reference level (6 dB) expands over a wide area. Particularly, for radio waves whose polarization direction is the X-axis direction, there is hardly any frequency band that satisfies the reference level as indicated by the curve L3 in the comparative example while in the antenna device 120 of the present disclosure, as indicated by the curve L1, the frequency band that satisfies the reference level extends from about 25 to 28 GHz band. Thus, it is clear that the characteristic of the return loss is improved substantially. In light of the fact that a sufficient width of the ground electrode GND cannot be secured relative to the width of the radiating element 121, those improvement effects described above are attributed to the placement of the high-dielectric layers 151 and 152 on the side surfaces 131 and 132 of the base body 130 in the X-axis direction.

As described above, in the antenna device 120 according to the present exemplary embodiment, in light of the fact that a sufficient width of the ground electrode GND cannot be secured relative to the width of the radiating element 121 (the shortest distance from the end part of the radiating element 121 to the end part of the ground electrode GND in the X-axis direction is less than 0.8 times the width W of the radiating element 121), the high-dielectric layers 151 and 152 whose dielectric constants are higher than that of the base body 130 are arranged on the side surfaces 131 and 132 of the base body 130 in the X-axis direction.

As described above, by adding the high-dielectric layers 151 and 152 on the side surfaces 131 and 132, the electrical lines of force originated from the end part of the radiating element 121 in the X-axis direction are not likely to be released to the outside of the high-dielectric layers 151 and 152 and are likely to fall onto the ground electrode GND via the inside or vicinity of the high-dielectric layer 151 or 152. As a result, even in the case where a sufficient width of the ground electrode GND cannot be secured relative to the width of the radiating element 121, the narrowing of the frequency band of the antenna device 120 can be suppressed.

The "top surface 130*a*", the "bottom surface 130*b*", and the "base body 130" of the present exemplary embodiment may correspond to the "top surface", the "bottom surface", and the "base body" of the present disclosure.

The "side surface 131" and the "side surface 132" of the present exemplary embodiment may correspond to the "first side surface" and the "second side surface" of the present disclosure. The "side surface 133" and the "side surface 134" of the present exemplary embodiment may correspond to the "third side surface" and the "fourth side surface" of the present disclosure.

The "X-axis direction" and the "Z-axis direction" of the present exemplary embodiment may correspond to the "first direction" and the "second direction" of the present disclosure.

The "radiating element 121" of the present embodiment may correspond to the "first radiating element" or the "third radiating element" of the present disclosure. The "ground electrode GND" of the present embodiment may correspond to the "ground electrode" of the present disclosure.

The "high-dielectric layers 151 and 152" of the present embodiment may correspond to the "first high-dielectric portions" of the present disclosure. The "high-dielectric layer 140" of the present embodiment may correspond to the "second high-dielectric portion" of the present disclosure.

Modified Example 1

As described above in FIG. 3, the high-dielectric layers 151 and 152 according to the foregoing exemplary embodiment are formed in such a manner as to cover the entirety of the side surfaces 131 and 132 of the base body 130, respectively. Further, when the high-dielectric layers 151 and 152 according to the foregoing exemplary embodiment are seen from the Z-axis direction, the entirety of the high-dielectric layers 151 and 152 is located outside the ground electrode GND.

However, the shapes of the high-dielectric layers 151 and 152 are not necessarily limited to the foregoing shapes illustrated in FIG. 3. The high-dielectric layers 151 and 152 only need to have shapes in such a way that at least part of one of the high-dielectric layers 151 and 152 is located between the radiating element 121 and the ground electrode GND when seen from the X-axis direction and is also located outside the ground electrode GND when seen from the Z-axis direction.

Figure 7:
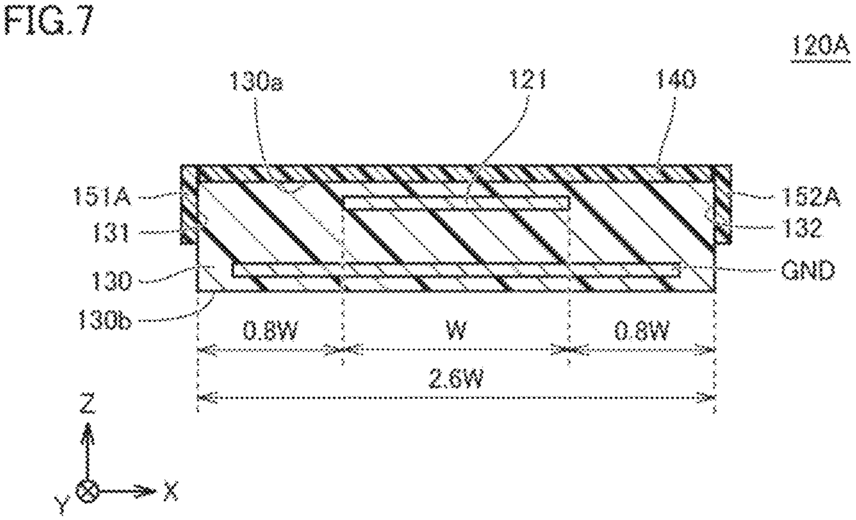
FIG. 7 is a cross-sectional view (part 2) of an antenna device.

FIG. 7 is a cross-sectional view of an antenna device 120A according to the present modified example 1. The antenna device 120A is obtained by modifying the high-dielectric layers 151 and 152 of the antenna device 120 to high-dielectric layers 151A and 152A. When the high-dielectric layers 151A and 152A are seen from the X-axis direction, the high-dielectric layers 151A and 152A each have part that overlaps the radiating element 121 but do not have part that overlaps the ground electrode GND.

FIG. 8 is a cross-sectional view of another antenna device 120B according to the present modified example 1. The antenna device 120B is obtained by modifying the high-dielectric layers 151A and 152A of the foregoing antenna device 120A illustrated in FIG. 7 to high-dielectric layers 151B and 152B. The high-dielectric layers 151B and 152B are obtained by removing upper parts of the high-dielectric layers 151A and 152A in such a manner as not to come in contact with the high-dielectric layer 140.

Figure 9:
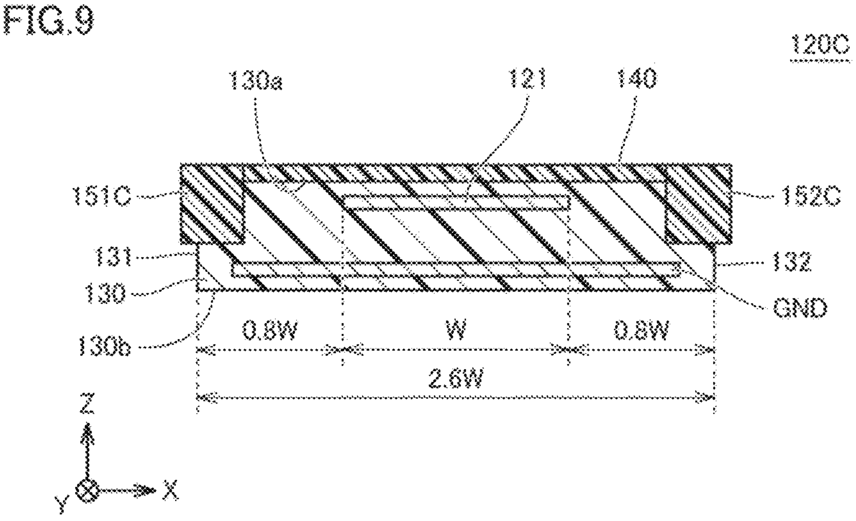
FIG. 9 is a cross-sectional view (part 4) of an antenna device.

FIG. 9 is a cross-sectional view of another antenna device 120C according to the present modified example 1. The antenna device 120C is obtained by modifying the high-dielectric layers 151A and 152A of the foregoing antenna device 120A illustrated in FIG. 7 to high-dielectric layers 151C and 152C. When the high-dielectric layers 151C and 152C are seen from the Z-axis direction, the high-dielectric layers 151C and 152C each have part that is located outside the ground electrode GND as well as part that overlaps the ground electrode GND.

With the antenna devices 120A, 120B, and 120C described above, at least part of each of the high-dielectric layers 151A, 152A, 151B, 152B, 151C, and 152C is located between the radiating element 121 and the ground electrode GND when seen from the X-axis direction and is also located outside the ground electrode GND when seen from the Z-axis direction. Accordingly, the electrical line of force originated from the end part of the radiating element 121 in the X-axis direction is likely to fall onto the ground electrode GND via the inside or vicinity of one of the high-dielectric layers 151A, 152A, 151B, 152B, 151C, and 152C. As a result, with the antenna devices 120A, 120B, and 120C, the narrowing of the frequency band is also suppressed.

Modified Example 2

The antenna device 120 according to the foregoing exemplary embodiment is an array antenna including a plurality of the radiating elements 121 arranged in an array formation. However, the antenna device 120 is not necessarily the array antenna.

Figure 10:
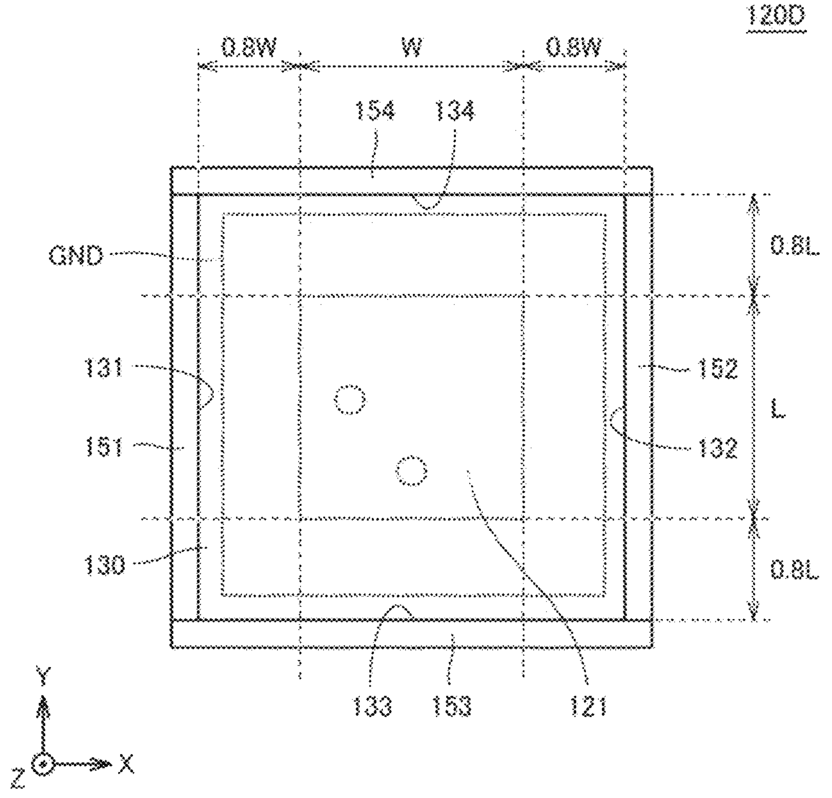
FIG. 10 is a plan view of an antenna device.

FIG. 10 is a plan view of an antenna device 120D according to the present modified example 2, which is seen from the Z-axis direction. The antenna device 120D is obtained by changing the number of the radiating elements 121 of the foregoing antenna device 120 to one.

Furthermore, by reducing the number of the radiating elements 121 to one, the dimensions of the base body 130 and the ground electrode GND in the Y-axis direction become shorter. Because of this, in the antenna device 120D, a sufficient dimension of the ground electrode GND is not secured relative to the size of the radiating element 121 in both the X-axis direction and the Y-axis direction. That is to say, in addition to the fact that the shortest distance in the X-axis direction from the end part of the radiating element 121 to the end part of the ground electrode GND is less than 0.8 times the dimension W of the radiating element 121 in the X-axis direction, the shortest distance in the Y-axis direction from the end part of the radiating element 121 to the end part of the ground electrode GND is less than 0.8 times the dimension L of the radiating element 121 in the Y-axis direction.

Therefore, in the antenna device 120D according to the present modified example 2, in addition to placing the high-dielectric layers 151 and 152 on the side surfaces 131 and 132 of the base body 130 in the X-axis direction, the high-dielectric layers 153 and 154 are arranged on the side surfaces 133 and 134 of the base body 130 in the Y-axis direction. Because of this, the electrical lines of force originated from an end part of the radiating element 121 in the Y-axis direction are likely to fall onto the ground electrode GND via the high-dielectric layers 153 and 154. As a result, in the antenna device 120D, for both the radio waves whose polarization direction is the X-axis direction and the radio waves whose polarization direction is the Y-axis direction, the narrowing of the frequency band is suppressed.

Modified Example 3

The antenna device 120 according to the foregoing exemplary embodiment has the structure that includes the radiating element 121 corresponding to a single frequency band. However, the structure of the antenna device 120 may alternatively be a so-called stuck structure in which radiating elements having different sizes, which respectively correspond to two or more frequency bands, are stacked on top of each other in the same board.

Figure 11:
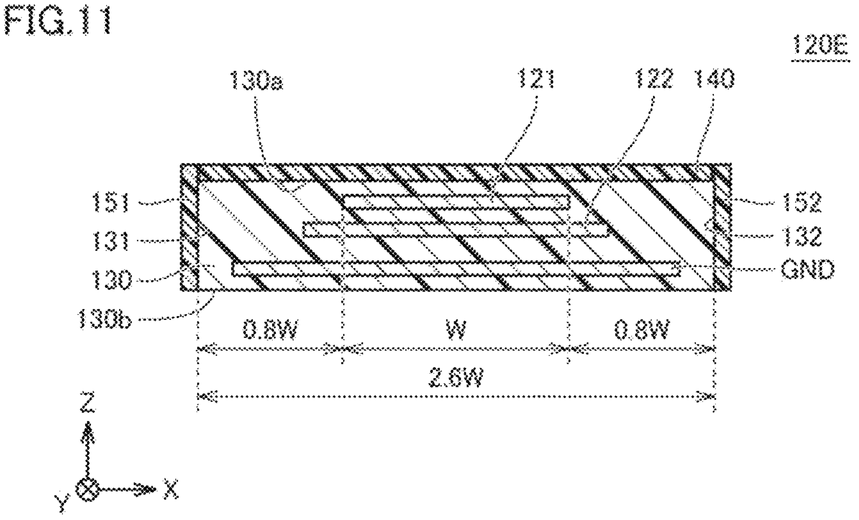
FIG. 11 is a cross-sectional view (part 5) of an antenna device.

FIG. 11 is a cross-sectional view of an antenna device 120E according to the present modified example 3. The antenna device 120E is obtained by adding a radiating element 122 to the foregoing antenna device 120D in a layer between the radiating element 121 and the ground electrode GND.

The size of the radiating element 122 is greater than the size of the radiating element 121. That is to say, the resonant frequency of the radiating element 122 is lower than the resonant frequency of the radiating element 121. Accordingly, the frequency band of radio waves radiated from the radiating element 122 is lower than the frequency band of radio waves radiated from the radiating element 121. For example, the center frequency of the frequency band of radio waves radiated from the radiating element 122 can be set to 28 GHz, and the center frequency of the frequency band of radio waves radiated from the radiating element 121 can be 39 GHz.

The high-dielectric layers 151 and 152 are formed in such a manner as to cover the entirety of the side surfaces 131 and 132 of the base body 130. Accordingly, when the high-dielectric layers 151 and 152 are seen from the X-axis direction, the high-dielectric layers 151 and 152 each have part that is located between the radiating element 121 and the radiating element 122 and part that is located between the radiating element 122 and the ground electrode GND. Because of this, it become possible to make electrical lines of forces originated from both the radiating elements 121 and 122 easier to fall onto the ground electrode GND.

Note that the high-dielectric layers 151 and 152 are not necessarily limited to the ones that cover the entirety of the side surfaces 131 and 132.

Figure 12:
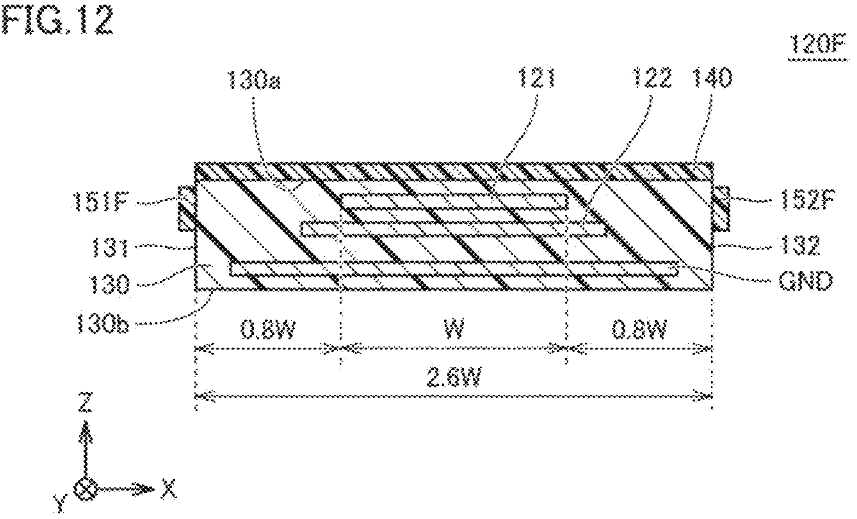
FIG. 12 is a cross-sectional view (part 6) of an antenna device.

FIG. 12 is a cross-sectional view of another antenna device 120F according to the present modified example 3. The antenna device 120F is obtained by modifying the high-dielectric layers 151 and 152 of the foregoing antenna device 120E illustrated in FIG. 11 to high-dielectric layers 151F and 152F. When the high-dielectric layers 151F and 152F are seen from the X-axis direction, each of the high-dielectric layers 151F and 152F has the part that exists between the radiating element 121 and the radiating element 122 but does not have the part that is located between the radiating element 122 and the ground electrode GND.

Even with the configuration described above, at least the electrical lines of force originated from the end part of the radiating element 121 in the Y-axis direction are likely to fall onto the ground electrode GND via the inside or vicinity of the high-dielectric layers 151F and 152F. As a result, it becomes possible to suppress at least the narrowing of the frequency band of the radiating element 121.

Figure 13:
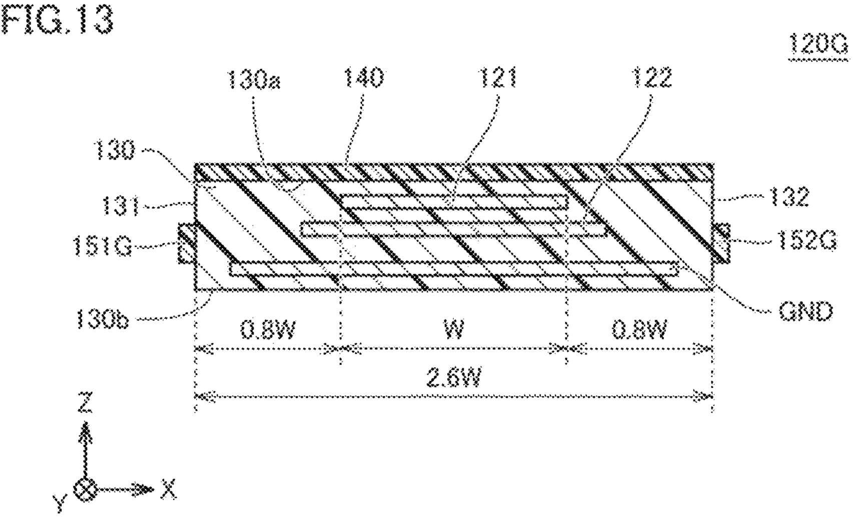
FIG. 13 is a cross-sectional view (part 7) of an antenna device.

FIG. 13 is a cross-sectional view of another antenna device 120G according to the present modified example 3. The antenna device 120G is obtained by modifying the high-dielectric layers 151 and 152 of the foregoing antenna device 120E illustrated in FIG. 11 to high-dielectric layers 151G and 152G. When the high-dielectric layers 151G and 152G are seen from the X-axis direction, the high-dielectric layers 151G and 152G each do not have the part that is located between the radiating element 121 and the radiating element 122 but have the part that is located between the radiating element 122 and the ground electrode GND.

Even with the configuration described above, at least the electrical lines of force originated from the end part of the radiating element 122 in the Y-axis direction are likely to fall onto the ground electrode GND via the high-dielectric layers 153 and 154. As a result, it becomes possible to suppress at least the narrowing of the frequency band of the radiating element 122. Further, it is expected that the electrical lines of force originated from the end part of the radiating element 121 in the Y-axis direction are likely to fall onto the ground electrode GND via the high-dielectric layers 153 and 154.

The "radiating element 122" of the present exemplary embodiment may correspond to the "second radiating element" of the present disclosure.

Other Modified Examples

In the antenna device 120 according to the present exemplary embodiment, the high-dielectric layer 140 is placed on the top surface 130*a* of the base body 130. However, the high-dielectric layer 140 may be omitted.

Further, in the antenna device 120 according to the present exemplary embodiment, the high-dielectric layers 151 and 152 are arranged on the side surfaces 131 and 132 of the base body 130, respectively. However, one of the high-dielectric layers 151 and 152 may be omitted.

Further, in the antenna device 120 according to the present exemplary embodiment, no high-dielectric layer is placed on the side surfaces 133 and 134 of the base body 130. However, a high-dielectric layer may be placed on each of the side surfaces 133 and 134.

Further, in the antenna device 120 according to the present exemplary embodiment, the top surface 130*a* and the bottom surface 130*b* of the base body 130 have rectangular shapes. However, the top surface 130*a* and the bottom surface 130*b* may have polygonal shapes each having five or more straight sides and angles.

Further, in the antenna device 120 according to the present exemplary embodiment, the ground electrode GND and the radiating element 121 are arranged in the same base body 130. However, the ground electrode GND may alternatively be placed in another base body (dielectric body) different from the base body 130. In the case where the ground electrode GND is placed in another base body different from the base body 130, the width of the base body 130 in which the radiating element 121 is placed may be made narrower than the width of the base body in which the ground electrode GND is placed.

It is to be understood that the embodiments disclosed herein are exemplary in all aspects and are not restrictive. It is intended that the scope of the present disclosure is defined by the claims, not by the description of the foregoing exemplary embodiments, and includes all variations which come within the meaning and range of equivalency of the claims.

REFERENCE SIGNS LIST

10 Communication device,
100 Antenna module,
111A-111H, 113A-113H, 117A, 117B Switch,
112AR-12 HR Low-noise amplifier,
112AT-112HT Power amplifier,
114A-114H Attenuator,
115A-115H Phase shifter,
116A, 116B Splitter,
118A, 118B Mixer,
119A, 119B Amplifier circuit,
120, 120A-120G Antenna device
121, 122 Radiating element,
130 Base body,
130*a* Top surface,
130*b* Bottom surface,
131, 132, 133, 134 Side surface,
140, 151, 151A, 151B, 151C, 151F, 151G, 152, 152A, 152B, 152C, 152F, 152G, 153, 154 High-dielectric layer,
GND Ground electrode.

The invention claimed is:

1. An antenna device comprising:

a base body having a top surface, a bottom surface, and a plurality of side surfaces that connect the top surface and the bottom surface, the top surface and the bottom surface having polygonal shapes, the top surface facing the bottom surface;

a first radiating element placed in the base body, the first radiating element having a plate-like shape and being arranged substantially parallel to the top surface;

a ground electrode placed at a position that is closer to the bottom surface than the first radiating element, the ground electrode having a plate-like shape and being arranged substantially parallel to the first radiating element; and a first high-dielectric portion whose dielectric constant is higher than that of the base body, wherein at least part of the first high-dielectric portion:

is located between the first radiating element and the ground electrode when the first high-dielectric portion is seen from a first direction that is a normal direction of a side surface of the plurality of side surfaces on which the first high-dielectric portion is placed, is located outside the ground electrode when the first high-dielectric portion is seen from a second direction that is a normal direction of the top surface, the first high-dielectric portion is placed on each of a first side surface and a second side surface of the plurality of side surfaces, and a bottom surface of the first high-dielectric portion placed on each of the first side surface and the second side surface is higher than a bottom surface of the base body.

2. The antenna device according to claim 1, wherein at least part of the first high-dielectric portion is located at an area that overlaps the first radiating element when the first high-dielectric portion is seen from the first direction.

3. The antenna device according to claim 2, wherein at least part of the first high-dielectric portion extends from the area that overlaps the first radiating element to an area that overlaps the ground electrode when the first high-dielectric portion is seen from the first direction.

4. The antenna device according to claim 1, wherein the first side surface and the second side surface face one another.

5. The antenna device according to claim 1, wherein the top surface has a rectangular shape having a shorter side and a longer side, the first side surface and the second side surface face one another with the shorter side interposed therebetween, and the plurality of side surfaces include a third side surface and a fourth side surface that face one another with the longer side interposed therebetween, and the first high-dielectric portion:

is not placed on either the third side surface or the fourth side surface.

6. The antenna device according to claim 1, further comprising:

a second high-dielectric portion placed on the top surface, a dielectric constant of the second high-dielectric portion being higher than that of the base body.

7. The antenna device according to claim 6, wherein the second high-dielectric portion is in contact with the first high-dielectric portion.

8. The antenna device according to claim 1, wherein the first radiating element has a feed point placed at a position shifted in the first direction from a center of a plane of the first radiating element.

9. The antenna device according to claim 8, wherein the first radiating element has:

a first feed point placed at a position shifted in the first direction from the center of the plane of the first radiating element, and a second feed point placed at a position shifted in a direction orthogonal to the first direction from the center of the plane of the first radiating element.

10. The antenna device according to claim 1, further comprising:

a second radiating element placed between the first radiating element and the ground electrode, the second radiating element having a plate-like shape and being arranged substantially parallel to the first radiating element and the ground electrode.

11. The antenna device according to claim 10, wherein at least part of the first high-dielectric portion is located between the first radiating element and the second radiating element and between the second radiating element and the ground electrode when the first high-dielectric portion is seen from the first direction.

12. The antenna device according to claim 1, wherein a shortest distance in the first direction from an end part of the first radiating element to an end part of the ground electrode is less than 0.8 times a dimension of the first radiating element in the first direction.

13. The antenna device according to claim 1, further comprising:

a third radiating element placed in the base body, the third radiating element being arranged in such a way that the third radiating element and the first radiating element are lined up in a direction orthogonal to the first direction and the second direction.

14. A communication device equipped with the antenna device according to claim 1.

15. The antenna device according to claim 1, wherein the first high-dielectric portion is embedded into the first side surface and the second side surface, at least in part.

16. The antenna device according to claim 1, wherein the base body is formed of a low temperature co-fired ceramic (LTCC).

17. The antenna device according to claim 1, wherein the base body is formed of a liquid crystal polymer (LCP).

18. The antenna device according to claim 1, wherein the base body includes a multilayer structure.

19. The antenna device according to claim 18, wherein each layer of the multilayer structure is formed of polyethylene terephthalate (PET).

20. The antenna device according to claim 1, wherein a size of the ground electrode is larger than a size of the first radiating element.

* * * * *